United States Patent [19]
Knox

[11] Patent Number: 5,931,573
[45] Date of Patent: Aug. 3, 1999

[54] EMERGENCY VEHICLE LIGHT BAR

[76] Inventor: Kenneth W. Knox, 52 N. Cove Dr., Hogansville, Ga. 30230

[21] Appl. No.: 09/079,717

[22] Filed: May 15, 1998

[51] Int. Cl.$^6$ .................................................. B60Q 9/00
[52] U.S. Cl. .......................... 362/493; 362/523; 340/471
[58] Field of Search .................................... 362/493, 523, 362/524, 526, 544, 35, 220, 250; 340/471

[56] References Cited

U.S. PATENT DOCUMENTS

| | | | |
|---|---|---|---|
| 3,271,735 | 9/1966 | Gosswiller | 340/50 |
| 3,721,374 | 3/1973 | Eby | 224/42.1 |
| 4,754,375 | 6/1988 | Ferenc | 362/74 |
| 4,956,753 | 9/1990 | Renfrew | 362/74 |
| 5,097,397 | 3/1992 | Stanuch et al. | 362/74 |
| 5,452,188 | 9/1995 | Green et al. | 362/227 |
| 5,585,783 | 12/1996 | Hall | 362/493 X |

Primary Examiner—Stephen Husar
Attorney, Agent, or Firm—Joseph N. Breaux

[57] ABSTRACT

An emergency vehicle light bar which comprises a center mounting mechanism which is mounted on an exterior center point of a emergency vehicle roof and which provides a pivotal mounting mechanism for two extending adjustable light bars, which said light bars comprise a plurality of fixedly secured lighting means and audible sirens, wherein the pivotally mounted light bars may be pivoted about the center point mounting mechanism to provide maximum vehicle visibility by altering the angle of said light bars about the center mounting mechanism. Further wherein a control panel is provided within the interior of the vehicle for controlling all operational aspects of the emergency vehicle light bar and further wherein a portable transmitting device is provided with operates certain parameters of the emergency vehicle light bar.

3 Claims, 3 Drawing Sheets

EMERGENCY VEHICLE LIGHT BAR

TECHNICAL FIELD

The present invention relates to devices and methods for emergency vehicle light bars which are mounted to a roof of a vehicle, and more particularly to devices and methods for an emergency vehicle light bar which includes two light bars each comprising a plurality of fixedly secured light fixtures and each pivotally mounted to a center mounting mechanism which is mounted to a center of a vehicle roof and further which includes a control system having a control panel in the vehicle and a remote control handheld transmitter for allowing emergency response personnel to operate the light and other devices on the light bars and to configure each of the light bars by remotely pivoting the light bars about the center mounting means to achieve the most advantageous and highly visible position for the lighting components to provide maximum visibility and safety.

BACKGROUND ART

Numerous emergency light bars and other devices have been disclosed for mounting to an emergency vehicle. These devices generally provide a static means for mounting lighting and noise emitting devices on a roof of an emergency vehicle. The devices mounted include noise emitting devices, strobe light, spot lights, flood lights, beepers, and movable spot lights. Prior to the present invention there has never been an emergency vehicle light bar with a mounting means which comprises two light bars each with a multiplicity of fixedly secured lighting fixtures and each being pivotally mounted to center mounting mechanism which is mounted to the center of a emergency vehicle roof thereby providing a means for independently altering the angle of each light bar to maximize visibility of the emergency vehicle for safety purposes.

The prior patents which are relevant include the following:

Green, et al U.S. Pat. No. 5,452,188 describes a light bar comprising a plurality of modules and control circuitry for selectively energizing the use of the modules. This device is extremely useful for emergency vehicles however it does not provide a means for selectively and independently altering the angle of two opposing light bars which are pivotally mounted to a center point of the roof of an emergency vehicle as a present invention. Consequently, the Green device does not provide effective side visibility for safety purposes as the present invention.

Stanuch, et al U.S. Pat. No. 5,097,397 discloses a light bar with a plurality of signaling devices statically mounted in a nonlinear fashion resembling a "V" when viewed from the top of the vehicle. Although this device does provide additional side visibility of the emergency vehicle it does not provide a means for altering the angle of a light bar with a plurality of fixedly secured lighting means. The present invention allows for adjusting visibility for a particular location of a emergency vehicle thereby providing maximum visibility for the emergency vehicle.

Renfrew, U.S. Pat. No. 4,956,753 discloses a lamp assembly suitable for use on a vehicle roof which includes a linear arrangement for mounting lighting devices which are not moveable as the present device and as described in more detail above.

Ferenc, U.S. Pat. No. 4,754,375 discloses numerous lighting systems and arrangements for emergency vehicles for wide range visibility this device is also extremely useful for particular lighting units however it does not provide opposing light bars pivotally mounted to a center mounting mechanism positioned on the roof of a vehicle as the present invention and does not provide selective maximizing of the emergency light as the present invention.

Eby, U.S. Pat. No. 3,721,374 discloses mounting brackets for linearly supporting emergency lights on the roof of an automobile, and Gosswiller, U.S. Pat. No. 3,271,735 discloses warning devices for emergency vehicles. These two devices are basically linear in dimension and do not provide the side visibility as the present invention and furthermore do not provide a selective means for changing the angle of light bars for maximum vehicle visibility and safety as the present invention.

GENERAL SUMMARY DISCUSSION OF INVENTION

It is thus an object of the invention to provide a Emergency Vehicle Light Bar that is mounted on the roof of an emergency vehicle and which comprises a center mounting mechanism mounted in the center of the vehicle roof with two light bars extending from said center position wherein said light bars are pivotally connected to the centered mounting mechanism and which light bars include a plurality of fixedly secured light fixtures and sound emitting devices as desired, further wherein said center position center mounting mechanism includes a spot light mounter within the center mounting mechanism and which remotely and selectively directed to areas of interest, and further wherein said light bars may be altered in position for maximum vehicle visibility as desired by the user, and further wherein the lighting system on said light bars and the angle of said light bars are controlled and operated from a control panel mounted within the interior of said vehicle or from a handheld transmitter allowing emergency personal to alter the configuration of the emergency light bars to a most advantageous and safe position.

It is a further object of the invention to provide an Emergency Vehicle Light Bar that may be adjusted by emergency personal within said vehicle as the vehicle is in operation to provide maximum emergency vehicle visibility as to pedestrians and the like.

It is a still further object of the invention to provide an Emergency Vehicle Light Bar that includes two pivotally mounted light bars which are pivotally mounted to a center mounting mechanism and which mounting mechanism is mounted to a center of an emergency vehicle roof thereby allowing the light bars to independently swing parallel to the vehicle roof surface about the center mounting mechanism and thereby alter the visibility of the lighting components on each light bar to achieve maximum visibility of the emergency vehicle.

Accordingly an emergency vehicle light bar is provided which includes a center mounting mechanism mounted to a roof center of an emergency vehicle which provides a means for pivotally mounting two emergency light bars which extend from the center mounting mechanism to an outside edge of said vehicle roof and wherein the light bars are independently moveable about the center mounting mechanism allowing the light to be moved parallel to the vehicle roof surface and which said emergency light bars include a plurality of fixedly secured lighting means, and further wherein a multidirectional spot light is mounted within the centered mounting mechanism, and further wherein a control panel for operating said light bar movement and activation of said lighting means is mounted within an interior of said emergency vehicle and which control panel controls all aspects of operation of the emergency light bar and further wherein a remote control unit is provided allowing emergency personal to operate certain aspects of the emergency light bar as desired to maximize visibility of the emergency vehicle as desired.

BRIEF DESCRIPTION OF THE DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

It can be seen from the following description that the emergency vehicle light bar provides an extremely effective emergency lighting mechanism for maximum visibility of emergency vehicles to pedestrians and other vehicle operators while also providing a high level of safety for operation of such vehicles. The emergency light bar is mounted to an exterior center portion of an emergency vehicle roof while all aspects of control of the light bar are controlled by a control panel mounted on the interior of the emergency vehicle. Depending on circumstances existing the operator of the vehicle may operate different lighting functions on the light bars and further the operator may alter the angle of the light bars which are pivotally mounted to the center mounting mechanism. Altering of the light bar angle provides for maximum visibility in situations where the emergency vehicle may be parked at an angle at the scene of an accident wherein the light bars are then positioned to provide maximum visibility of approaching vehicles to the accident scene. The center mounted mechanism includes a high intensity center mounted spotlight which is controlled by the control panel within the vehicle. A remote control unit allows emergency vehicle operators to control certain aspects of the light bar while a distance from the emergency vehicle.

Figure 1:
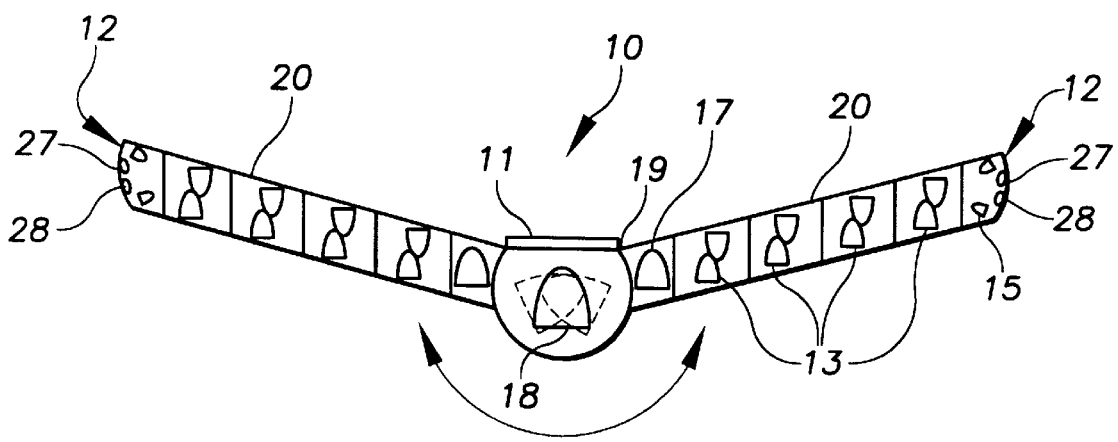
FIG. 1 is a top view of the emergency vehicle light bar illustrating the center positioning mechanism and the two pivotally mounted light bar members extending therefrom.

Referring to the figures in detail FIG. 1 illustrates a top view of the emergency vehicle light bar 10 illustrating the center mounting mechanism 11 which is spherical in dimension and which is fixedly secured to a center area on the exterior of an emergency vehicle roof. The device further includes two light bars 20 which are pivotally mounted 19 to said center mounting mechanism 11. When viewing the light bar mechanism from a top view as in FIG. 1 the mechanism resembles a "V". The "V" shape may be altered by swinging each light bar 20 separately either together forming a tight "V" or in a parallel fashion forming a straight line across the top of the emergency vehicle. The adjustability of the light bars 20 is also independent of each other providing a means for angling one light bar independent of the other in situations where desired for maximum visibility of the emergency beacons. The light bar 20 movement about the center mounting mechanism 10 is controlled by utilizing the control panel 30. Fixedly secured emergency strobe lights 13 are secured to each of the light bars 20 and which lights move with the light bars 20 as they adjusted about the center mounting mechanism 10. White strobes 15 are provided on the ends of each light bars 20 and are preferably the type known as "wig-wag". Additionally, a clear strobe light 17 known as a piercer II strobe light is mounted on each light bar 20 closest to the center mounting mechanism 10. The center mounting mechanism 10 also includes a multi-directional spotlight 18 which is selectively aimed by the user from within the vehicle utilizing a control panel 30. The multidirectional spot light 18 is positioned slightly higher than a profile of the light bars 20 so that shining the spot light 18 is not impeded by the light bars 20.

Figure 2A:
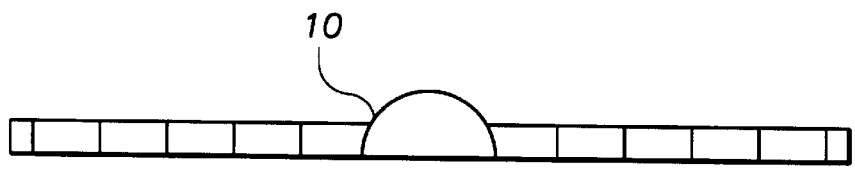
FIG. 2a is a front view of the emergency vehicle light bar illustrating the center positioning mechanism and the extending pivotally mounted light bars.
Figure 2B:
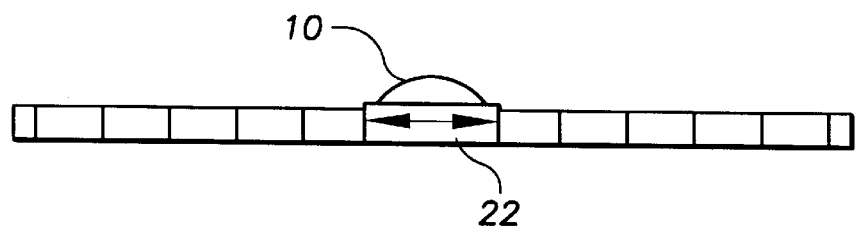
FIG. 2b is a back view of the emergency vehicle light bar illustrating the center positioning mechanism and the extending pivotally mounted light bars.

In FIG. 2b the backside of the center mounting mechanism 11 illustrates an amber directional light 22 for traffic approaching in the of the emergency vehicle. It should be noted that movement of the independent pivotally mounted light bars 15 does not impede the visibility of the rear mounted amber directional light 22 from the rear of the vehicle.

Figure 2C:
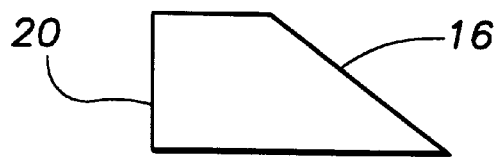
FIG. 2c is a side view of one of the pivotally mounted light bars illustrating its aerodynamic shape.
Figure 4:
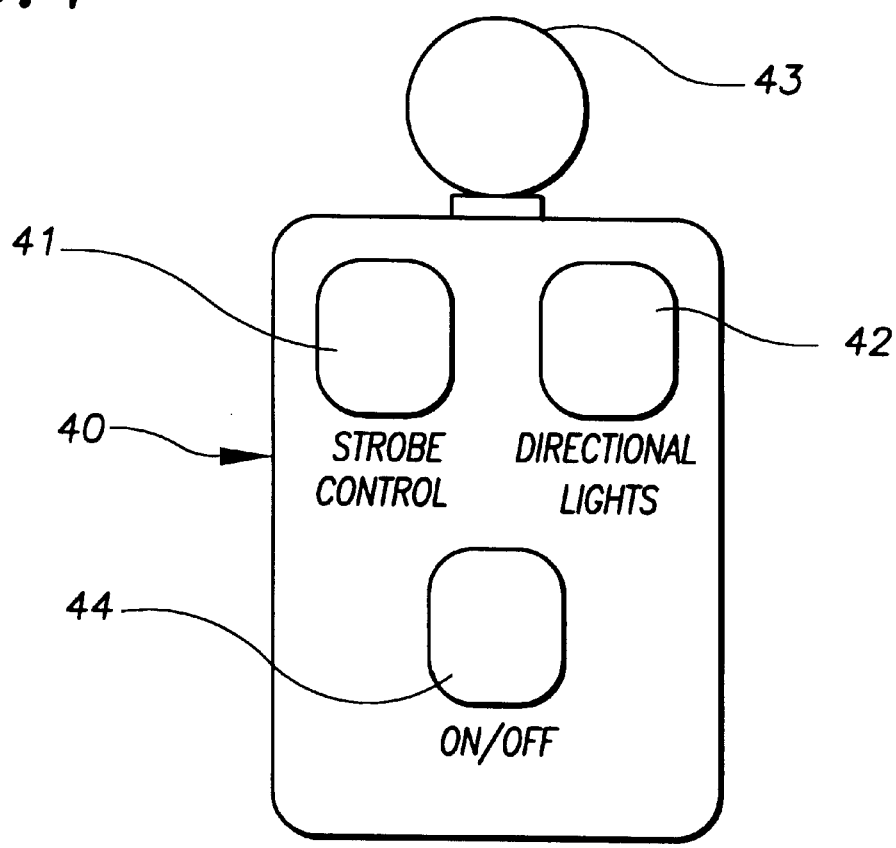
FIG. 4 is a portable transmitting device for controlling certain aspects of the emergency light bar operation.

An audible siren mechanism 28 is mounted within each moveable light bar 20 providing direction audible signals if necessary. Furthermore, an audible loud speaker 27 is also located in the end portion 12 of each light bar. Both the siren 28 and the loud speaker 27 are controllable from the interior of the vehicle utilizing the control panel 30. The light bars 20 are preferably constructed as an aerodynamic shape as illustrated in FIG. 2c which is a side view of one of the light bars 20. The beveled edge 16 is the leading edge of the light bar 20 and allows the light bar to move through air easily thereby reducing windage. The pivotal attachment points of the light bars 20 to the center mounting mechanism 19 allows for movement as described above and also as depicted in FIG. 1.

Figure 3:
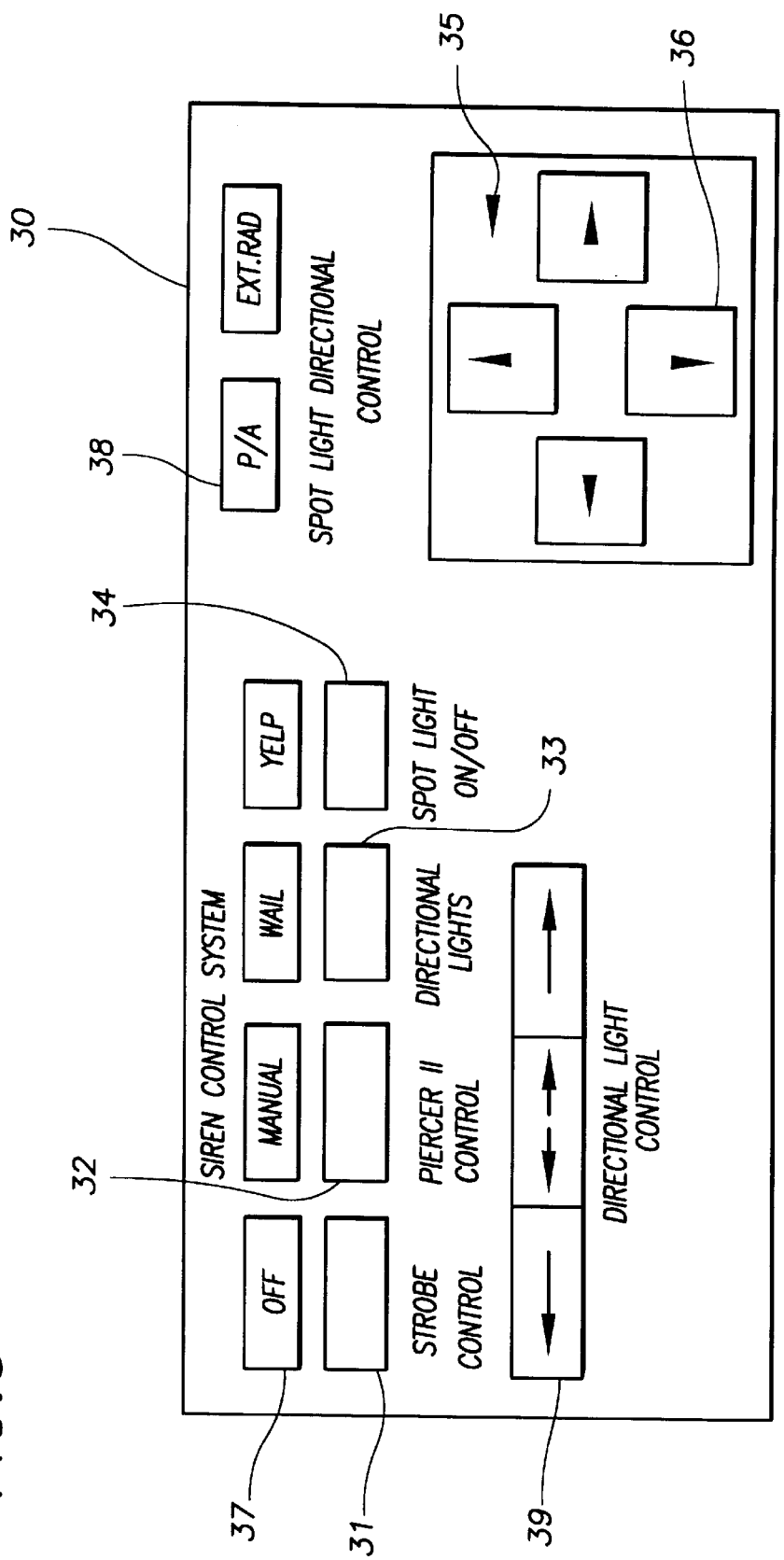
FIG. 3 is an illustration of a control panel located on the interior of a emergency vehicle for controlling operation of the emergency vehicle light bar.

The control panel 30 illustrated in FIG. 3 includes a means for controlling the strobes 31, a means for controlling the piercer II clear strobe 32, a means for controlling the directional lights 33, a means for controlling high intensity spotlights 34, a means or controlling spotlights directional control 35, a means for controlling light bar angle 36, a means for controlling audible siren activation 37, a means for controlling loud speakers 38, and a means for controlling directional light direction.

The remote control until 40 includes a means for controlling selected functional aspects of the emergency light bar including a means for controlling light lights 41, and a means for controlling directional lights 42. The remote unit 40 also preferably includes an on-off activation switch 44 and a means for attaching 43 the remote control unit 40 for security purposes. There may be other aspects of the emergency light bar controlled by the remote unit 40 without deviating from the intent of the present invention.

It is noted that the embodiment of the Emergency Vehicle Light Bar described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A Emergency Vehicle Light Bar comprising: a center mounting mechanism fixedly secured to a top exterior surface and center of an emergency vehicle roof, two elongated rectangular light bars with one end pivotally mounted to said center mounting mechanism providing light bar movement rotationally about the center mounting mechanism and parallel to the top exterior surface of the vehicle roof and further wherein said pivotal mounting provides independent movement of each light bar about the center mounting mechanism and further said light bars extend from the center mounting mechanism to an outside edge of the vehicle roof, the light bar pivotal attachment provides a means for altering the angle of the light bars for maximum visibility of the light bars, a plurality of strobe lights fixedly secure to each light bar and further positioned for maximum illumination on a front surface of the light bars, a plurality of strobe lights located on an end of each light bar providing for visibility of the emergency vehicle transverse to the vehicle's orientation, rear direction lights attached to a rear portion of the center mounting mechanism for providing directional indication for vehicle approaching the rear of the emergency vehicle, a multidirectional spot light mounted within the center mounting mechanism and further positioned for spot light illumination without being impeded by the light bars, an audible siren mounted within each light bar providing audible siren for alerting vehicle of the presence of the emergency vehicle, a control panel mounted within the interior of the emergency vehicle and which provides a means for controlling the strobe light, the multidirectional spot light, the rear directional light, the movement of the light bars about the center mounting mechanism, and the audible siren lighting attached to the light bars, a remote control unit which provides a means for controlling the rear directional light, the strobe light and further including an on/off switch.

2. The Emergency Vehicle Light Bar of claim 1, wherein the light bars further comprises: a loud speaker installed on each light bar, and further wherein the loud speaker is controlled by the control panel within the vehicle's interior.

3. The Emergency Vehicle Light Bar of claim 1, wherein the light bar further comprise: a beveled front edge for reducing windage on the light bars as the vehicle reaches high speeds.

* * * * *